United States Patent
Cai et al.

(10) Patent No.: US 8,436,858 B2
(45) Date of Patent: May 7, 2013

(54) METHOD AND APPARATUS FOR ANIMATING TRANSITION AMONG DYNAMIC GRAPH SERIES

(75) Inventors: Wei Jia Cai, Beijing (CN); Nan Cao, Beijing (CN); Shixia Liu, Beijing (CN); Li Tan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/562,505

(22) Filed: Sep. 18, 2009

(65) Prior Publication Data
US 2010/0073377 A1    Mar. 25, 2010

(30) Foreign Application Priority Data
Sep. 19, 2008   (CN) .......................... 2008 1 0149341

(51) Int. Cl.
*G06T 11/20* (2006.01)
*G06T 13/00* (2006.01)

(52) U.S. Cl.
USPC ........................... 345/440; 345/441; 345/474

(58) Field of Classification Search .................. 345/440, 345/441, 474; 715/853; 707/100
See application file for complete search history.

(56) References Cited

U.S. PATENT DOCUMENTS

| | | | |
|---|---|---|---|
| 2002/0085002 A1* | 7/2002 | Lamping et al. | 345/441 |
| 2007/0299950 A1 | 12/2007 | Kulkarni | |
| 2008/0052298 A1* | 2/2008 | Yeh | 707/100 |
| 2008/0316213 A1* | 12/2008 | Eagen et al. | 345/474 |
| 2010/0077352 A1* | 3/2010 | Heer et al. | 715/821 |
| 2010/0277481 A1* | 11/2010 | Cao et al. | 345/440 |

OTHER PUBLICATIONS

Reitz, F. et al "Focused Animation of Dynamic Compound Graphs", 2009 13th International Conference Information Visualisation, p. 679-684.*

Chungshen Xin, et al,. A novel layered graph model for topology formation and routing in dynamic spectrum access networks, New Frontiers in Dynamic Spectrum Access Networks, 2005 DySPAN 2005, 2005 First IEEE International Symposium on Volume, Issue,8-11, Nov. 2005 pp. 308-317, Digital Object Identifier 10.1109/DYSPAN.2005.1542647.

Letter from IBM China which indicates that the date of the issued Office Action is Jun. 12, 2012.

\* cited by examiner

*Primary Examiner* — Chante Harrison
(74) *Attorney, Agent, or Firm* — Scully, Scott, Murphy & Presser, P.C.; Gail H. Zarick, Esq.

(57) ABSTRACT

A method and an apparatus for animating transition among a dynamic graph series including a preceding graph and a succeeding graph which are temporally sequentially displayed. The method includes: selecting an unchanged node which is the nearest to a removed node and merging through animation the removed node with the unchanged node, thereby animating removal of the removed node; and selecting an unchanged node which is the nearest to an added node and splitting through animation the added node from the unchanged node, thereby animating addition of the added node. During the animation, the moving distances of the nodes can be shortened, and the crossing of movement paths and the crossing of graph edges can be prevented during the movement of the nodes, thereby visualizing smoothly and clearly transition among dynamic graph series.

12 Claims, 7 Drawing Sheets

METHOD AND APPARATUS FOR ANIMATING TRANSITION AMONG DYNAMIC GRAPH SERIES

CROSS REFERENCE TO RELATED APPLICATION

This application claims priority under 35 U.S.C. 119 from Chinese Patent Application 200810149341.X, filed Sep. 19, 2008, the entire contents of which are incorporated herein by reference.

BACKGROUND OF THE INVENTION

1. Field of the Invention

The present invention generally relates to the field of visualizing dynamic graphs and in particular to a method and an apparatus for animating transitions among a dynamic graph series.

2. Description of Related Art

Dynamic graphs, compared with static graphs, are changed over time. Graph elements (nodes/edges) will be added or removed or their attributes will be changed dynamically. The major purpose of visualizing dynamic graphs is to facilitate disclosing the change patterns along the time dimension. This will expose the essence of the graphs or network evolutions such as the evolutions of social communities in a social network.

Many challenges exist in dynamic graph visualization. One of the most important challenges is to smoothly transit graph changes between different time frames to keep users' focus. In particular, graph changes may be further classified into the following categories: 1. graph change due to removal of an element; 2. graph change due to addition of an element; and 3. graph change due to change of an attribute of an existing element. Removing or adding elements in a dynamic graph will directly change the topology. It is a significant change in a graph. Without any animated transitions, users might lose their focus and are confused about the sudden graph change. While the third type of graph change will be slighter, and it usually leads to the moving of the elements.

To visualize the above graph changes while preserving the user's mental map, several animating methods have been designed by dynamic graph visualization systems in the prior art. The latest and most powerful system is Sonia (see http://sonia.stanford.edu). The system provides a total solution of dynamic graph visualization including animated transition. In the system, edge driven animation is used to smoothly transit both the topology changes and attribute changes. All the nodes are initially laid out on the display (the isolated nodes are usually laid out on a circle). Edges are dynamically added or removed between nodes. The added or removed edges will drag two connected nodes together or release these nodes to their initial positions. The edge lengths are in inverse ratio to the edge weights. The changing of edge weights will lead to the movements of the connected nodes. The nodes are moved along a straight line path when animating. It is quite efficient and clear when the number of the changed elements is small. However, when the number of the changed elements is large, this edge driven transition method may produce visual clutter due to long moving distances of the nodes and a tendency that the moved elements are likely to overlap. Furthermore, in most cases, node elements are also added into or removed from the dynamic graph frequently. The edge driven animated transition method will not be enough.

SUMMARY OF THE INVENTION

In accordance with one aspect of the present invention, a method for animating transitions among graphs in a dynamic graph series having at least one preceding graph and at least one succeeding graph which are temporally sequentially displayed, wherein the succeeding graph has at least one unchanged node, removed node, and added node, is implemented on a data processing apparatus. The method includes the steps of: selecting an unchanged node which is the nearest to a removed node and merging through animation the removed node with the unchanged node, thereby animating removal of the removed node; and selecting an unchanged node which is the nearest to an added node and splitting through animation the added node from the unchanged node, thereby animating addition of the added node.

According to another aspect of the present invention, computer readable instructions are tangibly embodied in an article of manufacture. When a computer executes the instructions, the computer is caused to carry out the steps of the above method.

In still another aspect of the present invention, apparatus is provided for animating transition among a dynamic graph series that includes a preceding graph and a succeeding graph which are temporally sequentially displayed. The apparatus includes: a node removal animation unit configured to select an unchanged node which is the nearest to a removed node and to merge through animation the removed node with the unchanged node, thereby animating removal of the removed node; and a node addition animation unit configured to select an unchanged node which is the nearest to an added node and to split through animation the added node from the unchanged node, thereby animating addition of the added node.

BRIEF DESCRIPTION OF THE DRAWINGS

The present invention can be better understood with reference to the description given below in conjunction with the accompanying drawings, throughout which identical or like components are denoted by identical or like reference signs. In the drawings.

DETAILED DESCRIPTION OF PREFERRED EMBODIMENTS

Figure 1:
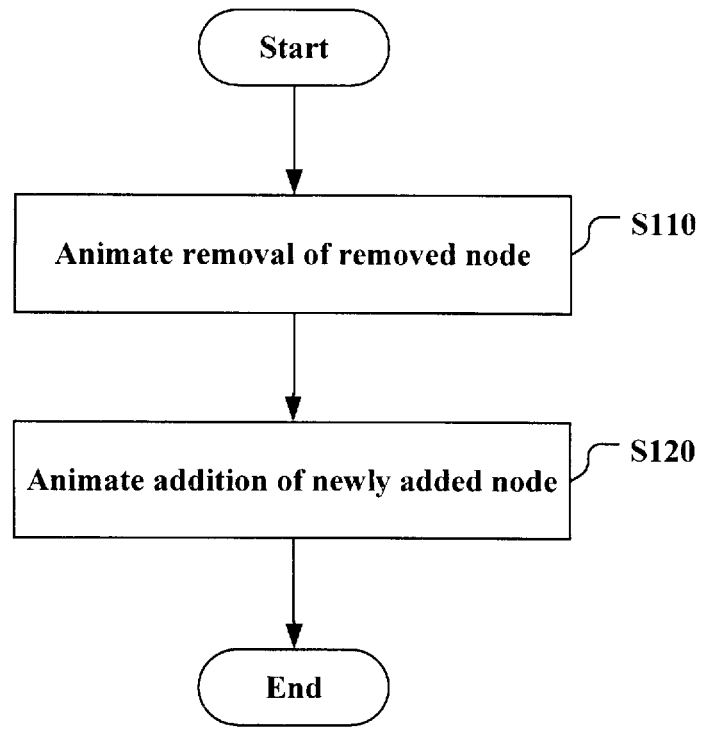
FIG. 1 is a flow chart of a method for animating transition among a dynamic graph series according to an embodiment of the present invention.

Exemplary embodiments of the present invention are described below in conjunction with the accompanying drawings. For the sake of clarity and conciseness, not all the features of actual implementations are described in the specification. However, it is to be appreciated that, during developing any such actual implementations, numerous implementation-specific decisions must be made to achieve the developer's specific goals, for example, compliance with system-related and business-related constraints which will vary from one implementation to another. Moreover, it is also to be appreciated that such a development effort might be very complex and time-consuming, but will nevertheless be a routine task for those skilled in the art having the benefit of this disclosure.

It is further noted that only device structures and/or steps closely relevant to implementing the present invention are illustrated in the drawings while omitting other details less relevant to the present invention, or well known to those skilled in the art, so as not to obscure the present invention due to those unnecessary details.

Referring to FIG. 1, a flow chart of a method for animating transition among a dynamic graph series according to an embodiment of the present invention is shown. The dynamic graph series includes a preceding graph and a succeeding graph which are temporally sequentially displayed.

As illustrated in FIG. 1, in step 110, an unchanged node which is the nearest to a removed node is selected and merged through animation with the removed node, thereby animating removal of the removed node. As further illustrated in FIG. 2 (*a*), during animated transition from a preceding graph to a succeeding graph, when a node n1 is to be removed from the preceding graph, the removed node n1 is merged with an unchanged node n2; that is, the removed node n1 is moved gradually from its current location to the position of the unchanged node n2, thereby animating removal of the removed node n1.

Figure 2:
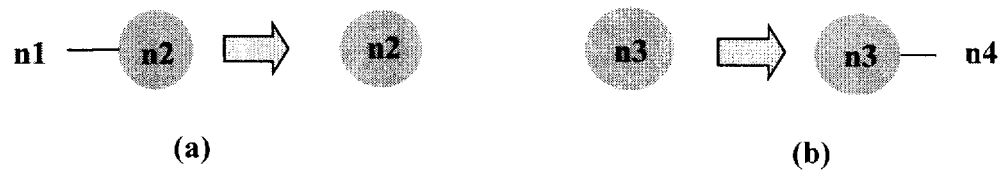
FIG. 2 is an illustrative diagram of the method for animating transition among a dynamic graph series according to the above embodiment of the present invention.

In step S120, an unchanged node which is the nearest to an added node is selected, and the added node is split through animation from the unchanged node, thereby animating addition of the added node. As illustrated in FIG. 2 (*b*), during animated transition from a preceding graph to a succeeding graph, when a new node n4 is to be added to the preceding graph, the added node n4 is split from an unchanged node n3, that is, the added node n4 is moved gradually from the location of the unchanged node n3 to a target location of the added node n4, thereby animating addition of the added node n4.

Figure 3:
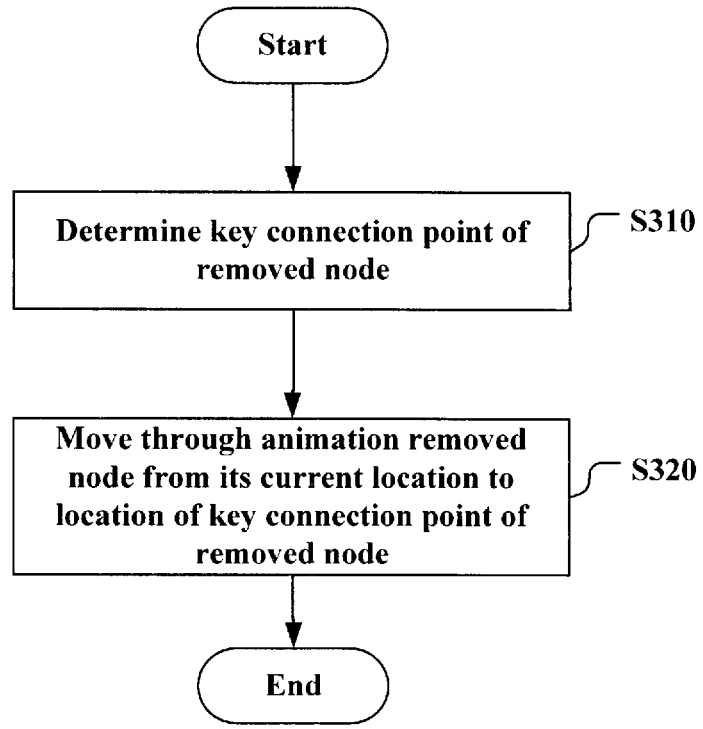
FIG. 3 is a detailed flow chart of a process of animating removal of a removed node as illustrated in FIG. 1.

Referring to FIG. 3, a detailed flow chart is shown of a process of animating removal of a removed node as illustrated in FIG. 1. As illustrated in FIG. 3, in step S310, a search is performed in the preceding graph for the nearest unchanged node connected with the removed node as a key connection point of the removed node. In particular, first a Breath-First-Search is performed from the removed node in the preceding graph to reach one or more unchanged nodes in the preceding graph which are connected with the removed node over the respective shortest paths, and the corresponding shortest paths are recorded as a set of the shortest paths. Next, for each shortest path in the set of the shortest paths, a weight of the shortest path is calculated by summing weights of respective edges in the shortest path. Then, a shortest path is selected in the set of the shortest paths by the path weights, and an unchanged node on the selected shortest path is determined as a key connection point of the removed node. In step S320, the removed node is moved through animation from its current location to the location of the determined key connection point of the removed node.

Figure 4:
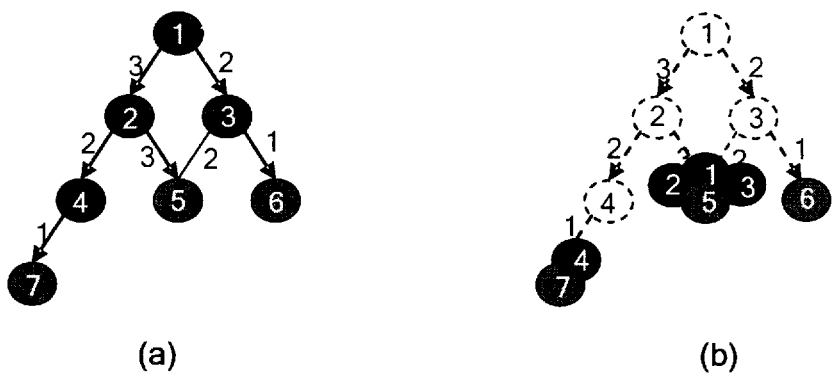
FIG. 4 is an illustrative diagram of a process of determining a key connection point of the removed node as illustrated in FIG. 3.

Referring to the example shown in FIG. 4, in order to more clearly describe how to determine a key connection point of a removed node, further explanations thereof are presented. FIG. 4 (*a*) corresponds to a preceding graph in a dynamic graph series, and FIG. 4 (*b*) corresponds to a succeeding graph in the dynamic graph series, wherein nodes 1, 2, 3 and 4 are removed nodes, and nodes 5, 6 and 7 are unchanged nodes.

A set of the shortest paths for the removed node 1 is {(1, 2, 5), (1, 3, 5), (1, 3, 6)}, where the path (1, 2, 5) has a weight of 3+3=6, the path (1, 3, 5) has a weight of 2+2=4, and the path (1, 3, 6) has a weight of 2+1=3, so that the unchanged node 5 is determined as a key connection point of the removed node 1. A set of the shortest paths for the removed node 2 is {(2, 5)}, where the path (2, 5) has a weight of 3, so that the unchanged node 5 is determined as a key connection point of the removed node 2. A set of the shortest paths for the removed node 3 is {(3, 5), (3, 6)}, where the path (3, 5) has a weight of 2, and the path (3, 6) has a weight of 1, so that the unchanged node 5 is determined as a key connection point of the removed node 3. A set of the shortest paths for the removed node 4 is {(4, 7)}, where the path (4, 7) has a weight of 1, so that the unchanged node 7 is determined as a key connection point of the removed node 4. It shall be noted that, although the shortest path with the greatest weight is selected in this example, the shortest path with the smallest weight may alternatively be selected, for example, in the case that a weight represents an extent to which nodes are distant from each other.

Figure 5:
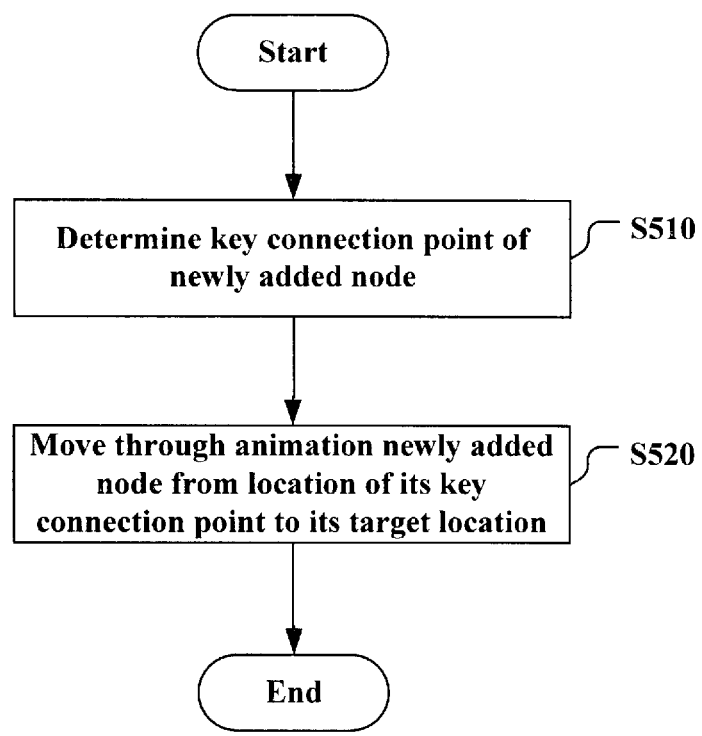
FIG. 5 is a detailed flow chart of a process of animating addition of an added node as illustrated in FIG. 1.

FIG. 5 is a detailed flow chart of a process of animating addition of a new node as generally illustrated in FIG. 1. Referring to FIG. 5, in step S510, similar to step S310 in FIG. 3, a search is performed in the succeeding graph for the nearest unchanged node connected with the added node as a key connection point of the added node. In particular, first a Breath-First-Search is performed from the added node in the succeeding graph to reach one or more unchanged nodes in the succeeding graph which are connected with the added node over the respective shortest paths, and the corresponding shortest paths are recorded as a set of the shortest paths. Next, for each shortest path in the set of the shortest paths, a weight of the shortest path is calculated by summing weights of respective edges in the shortest path. Then, a shortest path is selected in the set of the shortest paths by the path weights, and an unchanged node on the selected shortest path is determined as a key connection point of the added node.

In step S520, the added node is moved through animation from the location of the key connection point of the added node to a target location of the added node.

As is apparent from the above, in the above method according to this embodiment of the present invention, removal of a removed node is animated by merging it with the nearest unchanged node thereof, and addition of an added node is animated by splitting it from the nearest unchanged node thereof. Thus, during the animation, the moving distances of the nodes can be shortened, and the crossing of movement paths and the crossing of graph edges can be prevented during the movement of the nodes, thereby visualizing smoothly and clearly transition among dynamic graph series.

Furthermore, with respect to a graph change that separated first and second connectivity sub-graphs are connected into a connectivity graph due to addition of one or more edges, a novel solution is proposed according to an embodiment of the present invention in order to reduce the number of moved nodes and to highlight a topology change. Explanations thereof are presented below with reference to the flow chart of FIG. 6.

Figure 6:
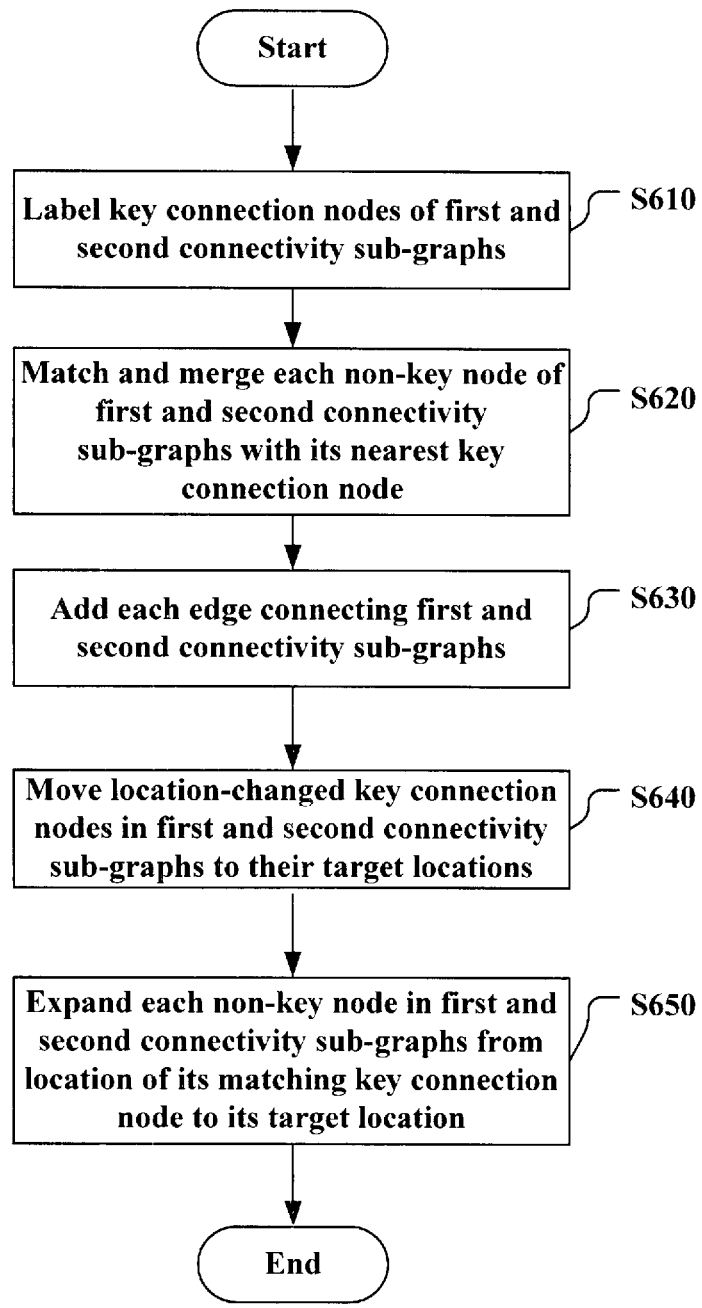
FIG. 6 is a flow chart of a process of animating a graph change that separated first and second connectivity sub-graphs are connected into a connectivity graph due to addition of one or more edges according to an embodiment of the present invention.

As illustrated in FIG. 6, in step S610, with respect to each edge connecting the first and second connectivity sub-graphs to be added, a node on the edge, which belongs to the first connectivity sub-graph, is labeled as a key connection node of the first connectivity sub-graph, and a node on the edge, which belongs to the second connectivity sub-graph, is labeled as a key connection node of the second connectivity sub-graph.

In step S620, each non-key node in the first connectivity sub-graph (i.e., each node other than the key connection node) is matched and merged with the nearest key connection node in the first connectivity sub-graph, and each non-key node in the second connectivity sub-graph is matched and merged with the nearest key connection node in the second connectivity sub-graph. The match process here is similar to the process of determining the key connection point of the removed node in step S310 of FIG. 3, and therefore repeated description thereof is omitted here. Optionally, in the process of step S620, in order to make a graph resulting from the merging process in each of the first and second connectivity sub-graphs to be still a connectivity graph, with respect to any two key connection nodes n1 and n2 in the connectivity sub-graph, an edge is added between the two key connection nodes n1 and n2 if there is no edge between the two key connection nodes n1 and n2 and there is at least one edge connecting the key connection node n1 or its matching non-key node and the key connection node n2 or its matching non-key node in the connectivity sub-graph. In step S630, each edge connecting the first and second connectivity sub-graphs is added.

Optionally, in step S640, when the locations of one or more key connection nodes of the first or second connectivity sub-graph are changed, the one or more key connection nodes in the first or second connectivity sub-graph are moved to their target location.

In step S650, each non-key node in the first and second connectivity sub-graphs is expanded from the location of its matching key connection node to its target location.

Figure 7:
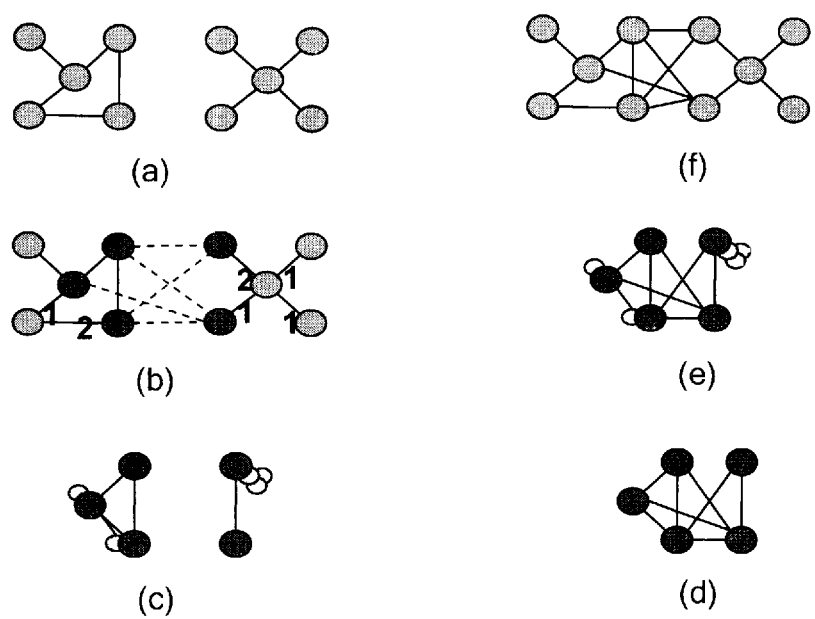
FIG. 7 is an illustrative diagram of the process of animating a graph change that separated first and second connectivity sub-graphs are connected into a connectivity graph due to addition of one or more edges as illustrated in FIG. 6.

FIG. 7 illustrates an example of the process of animating a graph change that separated first and second connectivity sub-graphs are connected into a connectivity graph due to addition of one or more edges. FIG. 7 (a) illustrates the first and second connectivity sub-graphs to be connected. FIG. 7 (b) corresponds to step S610 of FIG. 6, where dashed edges represent edges to be added, which connect the first and second connectivity sub-graph, and therefore dark colored nodes therein are determined as key connection nodes. FIG. 7 (c) corresponds to step S620 of FIG. 6, where light colored nodes as non-key nodes are matched and merged with the dark colored nodes as the key connection nodes. FIG. 7 (d) corresponds to steps S630 and S640 of FIG. 6, where the new edges connecting the first and second connectivity sub-graphs are added, and the key connection nodes are moved to their target locations. FIG. 7 (e) corresponds to step S650 of FIG. 6, where the non-key nodes are expanded from the key connection nodes. FIG. 7 (f) indicates the final result.

Similarly, with respect to a graph change that a connectivity graph is separated into separated first and second connectivity sub-graphs due to removal of one or more edges, a corresponding solution is proposed according to an embodiment of the present invention. Explanations thereof are presented below with reference to the flow chart of FIG. 8.

Figure 8:
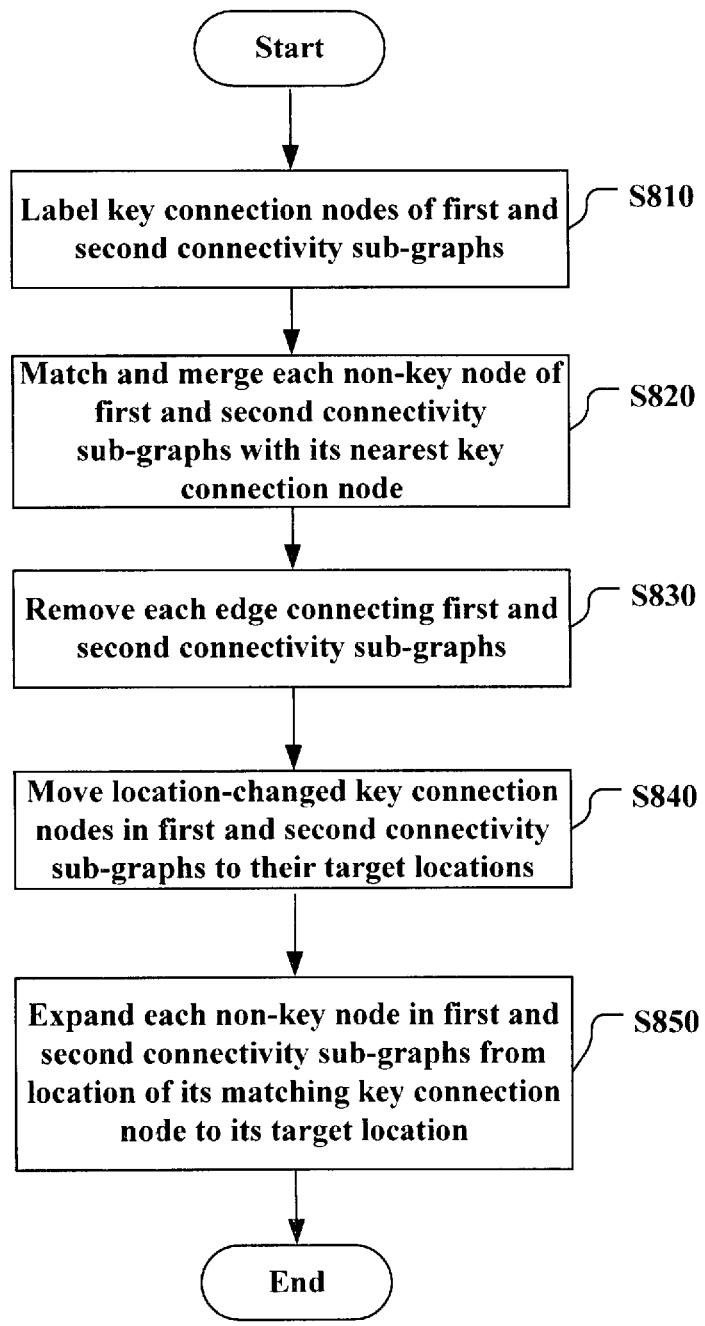
FIG. 8 is a flow chart of a process of animating a graph change that a connectivity graph is separated into separated first and second connectivity sub-graphs due to removal of one or more edges according to an embodiment of the present invention.

As illustrated in FIG. 8, in step S810, with respect to each edge connecting the first and second connectivity sub-graphs to be removed, a node on the edge, which belongs to the first connectivity sub-graph, is labeled as a key connection node of the first connectivity sub-graph, and a node on the edge, which belongs to the second connectivity sub-graph, is labeled as a key connection node of the second connectivity sub-graph.

In step S820, each non-key node in the first connectivity sub-graph is matched and merged with the nearest key connection node in the first connectivity sub-graph, and each non-key node in the second connectivity sub-graph is matched and merged with the nearest key connection node in the second connectivity sub-graph. The match process here is similar to the process of determining the key connection point of the removed node in step S310 of FIG. 3, and therefore repeated description thereof is omitted here.

Optionally, in order to make a graph resulting from the merging process in each of the first and second connectivity sub-graphs to be still a connectivity graph, with respect to any two key connection nodes n1 and n2 in the connectivity sub-graph, an edge is added between the two key connection nodes n1 and n2 if there is no edge between the two key connection nodes n1 and n2 and there is at least one edge connecting the key connection node n1 or its matching non-key node and the key connection node n2 or its matching non-key node in the connectivity sub-graph. In step S830, each edge connecting the first and second connectivity sub-graphs is removed.

Optionally, in step S840, when the locations of one or more key connection nodes of the first or second connectivity sub-graph are changed, the one or more key connection nodes in the first or second connectivity sub-graph are moved to their target locations. In step S850, each non-key node in the first and second connectivity sub-graphs is expanded from the location of its matching key connection node to its target location.

Furthermore, when transitions among a series of dynamic graphs include at least two of: (i) a graph change related to a removed node; (ii) a graph change related only to an unchanged node; and (iii) a graph change related to an added, a multi-stage animation control solution is provided according to an embodiment of the present invention in order to prevent a failure of visualizing clearly the graph changes due to concurrent animations thereof.

In particular, first, a graph change related to a removed node is animated, which may involve removal of a node, removal of an edge connecting two removed nodes and removal of an edge connecting a removed node and an unchanged node. Here, edge animation may be accompanied by node animation.

Then a graph change related only to an unchanged node is animated, which may involve removal of an edge between unchanged nodes, addition of a new edge between unchanged nodes and movement of an unchanged node to a new target location. Here, edge animation may be independent of node animation. Finally, a graph change related to an added node is animated, which may involve addition of a new node, addition of a new edge connecting added nodes and addition of a new edge connecting an added node and an unchanged node. Here, edge animation may be accompanied by node animation.

Figure 9:
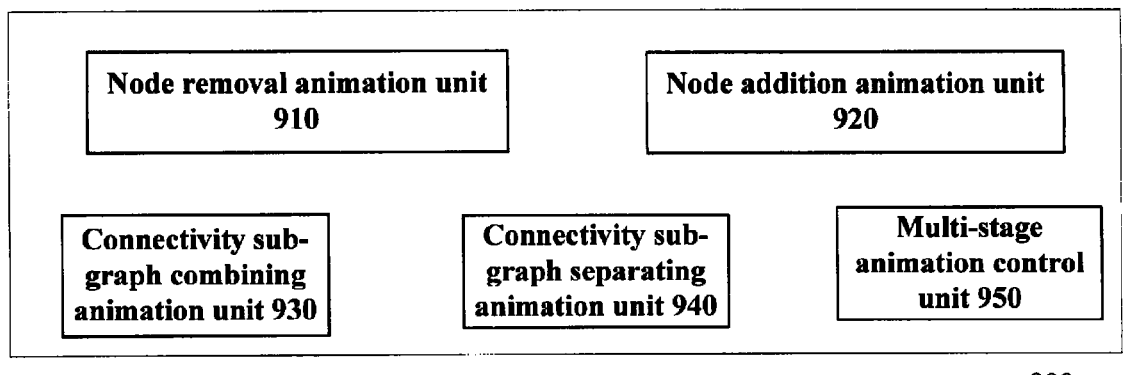
FIG. 9 is a block diagram of an apparatus for animating transition among graphs of a dynamic graph series according to an embodiment of the present invention.

Referring to FIG. 9, a block diagram depicts an apparatus 900 for animating transition among a dynamic graph series according to an embodiment of the present invention. As above, only parts closely relevant to the present invention are illustrated for conciseness. The apparatus 900 may perform the method for animating transition among a dynamic graph series as described above with reference to FIG. 1, thereby visualizing smoothly and clearly transitions among dynamic graph series.

As illustrated in FIG. 9, the apparatus 900 may include a node removal animation unit 910 configured to select an unchanged node which is the nearest to a removed node and to merge through animation the removed node with the unchanged node, thereby animating removal of the removed node. A node addition animation unit 920 is configured to select an unchanged node which is the nearest to an added node and to split through animation the added node from the unchanged node, thereby animating addition of the added node.

Optionally, the apparatus 900 may further include a connectivity sub-graph combining animation unit 930 configured to animate a graph change due to addition of one or more edges by the following processes. With respect to each edge connecting the first and second connectivity sub-graphs to be added, a node on the edge which belongs to the first connectivity sub-graph is labeled as a key connection node of the first connectivity sub-graph, and a node on the edge which belongs to the second connectivity sub-graph is labeled as a key connection node of the second connectivity sub-graph. Each non-key node in the first connectivity sub-graph is matched and merged with the nearest key connection node in the first connectivity sub-graph, and each non-key node in the second connectivity sub-graph is matched and merged with the nearest key connection node in the second connectivity sub-graph. Each edge connecting the first and second connectivity sub-graphs is added; and each non-key node in the first and second connectivity sub-graphs is expanded from the location of its matching key connection node to its target location.

Optionally, the apparatus 900 may further include a connectivity sub-graph separating animation unit 940 configured to animate a graph change that a connectivity graph is separated into separated first and second connectivity sub-graphs due to removal of one or more edges by the following processes. With respect to each edge connecting the first and second connectivity sub-graphs to be removed, a node on the edge which belongs to the first connectivity sub-graph is labeled as a key connection node of the first connectivity sub-graph, and a node on the edge, which belongs to the second connectivity sub-graph, is labeled as a key connection node of the second connectivity sub-graph. Each non-key node in the first connectivity sub-graph is matched and merged with the nearest key connection node in the first connectivity sub-graph, and each non-key node in the second connectivity sub-graph is matched and merged with the nearest key connection node in the second connectivity sub-graph. Each edge connecting the first and second connectivity sub-graphs is removed; and each non-key node in the first and second connectivity sub-graphs is expanded from the location of its matching key connection node to its target location.

Optionally, the apparatus 900 may further include a multi-stage animation control unit 950 configured to enforce such a control that first a graph change related to a removed node is animated, then a graph change related only to an unchanged node is animated, and finally a graph change related to an added node is animated.

How to implement the functions of the respective components of the apparatus 900 will be apparent upon the review of the descriptions of the corresponding processes as presented above, and therefore further descriptions thereof are omitted here.

Furthermore, it is clear that the operation procedure of the method according to the present invention described above can also be implemented in the form of a computer executable program stored in various machine readable storage media.

Moreover, the objects of the present invention can also be implemented by providing a storage medium with codes of the above executable program stored thereon directly or indirectly to a system or device and then reading out and executing the program codes by a computer or central processing unit (CPU) of the system or device. At this time, as long as the system or device has a function of executing a program, implementing modes of the present invention are not limited to the program, and the program can be in any form of, for example, an object program, program executed by an interpreter, or script program provided to an operating system, etc. The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a client computer by connecting to corresponding websites on the Internet, downloading the computer program codes according to the present invention and installing the same into the computer and then executing the program codes.

Although embodiments of the present invention have been described in detail with reference to the accompanying drawings, it should be noted that these embodiments are used to illustrate the present invention but not to limit it. The above and various other modifications and changes can be made by those skilled in the art without departing from the spirit and scope of the present invention as defined by the appended claims.

What is claimed is:

1. A method for animating transitions among graphs in a dynamic graph series having at least one preceding graph and at least one succeeding graph which are temporally sequentially displayed, wherein the graph has at least one unchanged node, removed node, and added node, wherein the method is implemented on a data processing apparatus and comprises the steps of:
   selecting an unchanged node which is the nearest to a removed node and merging through animation the removed node with the unchanged node, thereby animating removal of the removed node; and
   selecting an unchanged node which is the nearest to an added node and splitting through animation the added node from the unchanged node, thereby animating addition of the added node;
   wherein at least one of the steps is carried out using a computer device;
   wherein animating removal of the removed node further comprises:
   (a) searching the preceding graph for the nearest unchanged node connected with the removed node as a key connection point of the removed node; and
   (b) moving through animation the removed node from its current location to the location of the key connection point of the removed node;
   wherein the searching associated with the removal further comprises:
   (a) performing a Breath-First-Search from the removed node in the preceding graph to reach one or more unchanged nodes in the preceding graph which are connected with the removed node over the respective shortest paths;

(b) recording the shortest paths as a set of the shortest paths;
(c) calculating for each shortest path in the set of the shortest paths a weight of the shortest path by summing weights of respective edges in the shortest path;
(d) selecting a shortest path in the set of the shortest paths by the path weights; and
(e) determining an unchanged node on the selected shortest path as the key connection point of the removed node;

wherein animating addition of the added node further comprises:
(a) searching the succeeding graph for the nearest unchanged node connected with the added node as a key connection point of the added node; and
(b) moving through animation the added node from the location of the key connection point of the added node to a target location of the added node; and wherein the searching associated with the addition further comprises:
(a) performing a Breath-First-Search from the added node in the succeeding graph to reach one or more unchanged nodes in the succeeding graph which are connected with the added node over the respective shortest paths;
(b) recording the shortest paths as a set of the shortest paths;
(c) calculating for each shortest path in the set of the shortest paths a weight of the shortest path by summing weights of respective edges in the shortest path;
(d) selecting a shortest path in the set of the shortest paths by the path weights; and
(e) determining an unchanged node on the selected shortest path as the key connection point of the added node.

2. The method according to claim 1, wherein sub-graphs are connected into a connectivity graph due to addition of one or more edges and the method further comprises:
connecting, for each edge, the first and second connectivity sub-graphs to be added;
labeling a node on the edge which belongs to the first connectivity sub-graph as a key connection node of the first connectivity sub-graph;
labeling a node on the edge which belongs to the second connectivity sub-graph as a key connection node of the second connectivity sub-graph;
matching and merging each non-key node in the first connectivity sub-graph with the nearest key connection node in the first connectivity sub-graph;
matching and merging each non-key node in the second connectivity sub-graph with the nearest key connection node in the second connectivity sub-graph;
adding each edge connecting the first and second connectivity sub-graphs; and
expanding each non-key node in the first and second connectivity sub-graphs from the location of its matching key connection node to its target location.

3. The method according to claim 2 wherein, when the location of at least one key connection node of the first or second connectivity sub-graph is changed, the method further comprises:
moving the at least one key connection node of the first or second connectivity sub-graph to its target location.

4. The method according to claim 1 wherein, with respect to a graph change so that a connectivity graph is separated into separated first and second connectivity sub-graphs due to removal of one or more edges, the method further comprises:
connecting for each edge the first and second connectivity sub-graphs to be removed;
labeling a node on the edge which belongs to the first connectivity sub-graph as a key connection node of the first connectivity sub-graph;
labeling a node on the edge which belongs to the second connectivity sub-graph as a key connection node of the second connectivity sub-graph;
matching and merging each non-key node in the first connectivity sub-graph with the nearest key connection node in the first connectivity sub-graph;
matching and merging each non-key node in the second connectivity sub-graph with the nearest key connection node in the second connectivity sub-graph;
removing each edge connecting the first and second connectivity sub-graphs; and
expanding each non-key node in the first and second connectivity sub-graphs from the location of its matching key connection node to its target location.

5. The method according to claim 4 wherein, when the location of at least one key connection node of the first or second connectivity sub-graph is changed, the method further comprises:
moving the at least one key connection node in the first or second connectivity sub-graph to its target location.

6. The method according to claim 1 wherein:
a graph change related to a removed node is animated;
then a graph change related only to an unchanged node is animated; and
then a graph change related to a newly added node is animated.

7. An apparatus for animating transitions among a dynamic graph series which includes a preceding graph and a succeeding graph that are temporally sequentially displayed, wherein the graph has at least one unchanged node, removed node, and added node, wherein the apparatus comprises:
a node removal animation unit configured to select an unchanged node which is the nearest to a removed node and to merge through animation the removed node with the unchanged node, thereby animating removal of the removed node; and
a node addition animation unit configured to select an unchanged node which is the nearest to an added node and to split through animation the added node from the unchanged node, thereby animating addition of the added node;
wherein the node removal animation unit is further configured to animate removal of the removed node by:
(a) searching the preceding graph for the nearest unchanged node connected with the removed node as a key connection point of the removed node; and
(b) moving through animation the removed node from its current location to the location of the key connection point of the removed node;
wherein the node removal animation unit is further configured to perform the search of the preceding graph for the nearest unchanged node connected with the removed node as the key connection point of the removed node by:
(a) performing a Breath-First-Search from the removed node in the preceding graph to reach one or more unchanged nodes in the preceding graph which are connected with the removed node over the respective shortest paths;
(b) recording the shortest paths as a set of the shortest paths;

(c) calculating for each shortest path in the set of the shortest paths a weight of the shortest path by summing weights of respective edges in the shortest path;

(d) selecting a shortest path in the set of the shortest paths by the path weights; and (e) determining an unchanged node on the selected shortest path as the key connection point of the removed node;

wherein the node addition animation unit is further configured to animate addition of the added node by:

(a) searching the succeeding graph for the nearest unchanged node connected with the added node as a key connection point of the added node; and (b) moving through animation the added node from the location of the key connection point of the added node to a target location of the added node; and wherein the node addition animation unit is further configured to perform the search of the succeeding graph for the nearest unchanged node connected with the added node as the key connection point of the added node by:

(a) performing a Breath-First-Search from the added node in the succeeding graph to reach one or more unchanged nodes in the succeeding graph which are connected with the added node over the respective shortest paths;

(b) recording the shortest paths as a set of the shortest paths;

(c) calculating for each shortest path in the set of the shortest paths a weight of the shortest path by summing weights of respective edges in the shortest path;

(d) selecting a shortest path in the set of the shortest paths by the path weights; and (e) determining an unchanged node on the selected shortest path as the key connection point of the added node.

8. The apparatus according to claim 7 further comprising a connectivity sub-graph combining animation unit configured to animate a graph change that separated first and second connectivity sub-graphs due to addition of one or more edges by the following steps:

for each edge connecting the first and second connectivity sub-graphs to be added, labeling a node on the edge which belongs to the first connectivity sub-graph as a key connection node of the first connectivity sub-graph, and labeling a node on the edge which belongs to the second connectivity sub-graph as a key connection node of the second connectivity sub-graph;

matching and merging each non-key node in the first connectivity sub-graph with the nearest key connection node in the first connectivity sub-graph, and matching and merging each non-key node in the second connectivity sub-graph with the nearest key connection node in the second connectivity sub-graph;

adding each edge connecting the first and second connectivity sub-graphs; and expanding each non-key node in the first and second connectivity sub-graphs from the location of its matching key connection node to its target location.

9. The apparatus according to claim 8 wherein the connectivity sub-graph combining animation unit is further configured to move the at least one key connection node in the first or second connectivity sub-graph to its target location when the location of at least one key connection node of the first or second connectivity sub-graph is changed.

10. The apparatus according to claim 7 further comprising a connectivity sub-graph separating animation unit configured to animate a graph change when a connectivity graph is separated into separated first and second connectivity sub-graphs due to removal of one or more edges by the following steps:

for each edge connecting the first and second connectivity sub-graphs to be removed, labeling a node on the edge which belongs to the first connectivity sub-graph as a key connection node of the first connectivity sub-graph, and labeling a node on the edge, which belongs to the second connectivity sub-graph, as a key connection node of the second connectivity sub-graph;

matching and merging each non-key node in the first connectivity sub-graph with the nearest key connection node in the first connectivity sub-graph, and matching and merging each non-key node in the second connectivity sub-graph with the nearest key connection node in the second connectivity sub-graph;

removing each edge connecting the first and second connectivity sub-graphs; and expanding each non-key node in the first and second connectivity sub-graphs from the location of its matching key connection node to its target location.

11. The apparatus according to claim 10 wherein the connectivity sub-graph separating animation unit is further configured to move the at least one key connection node in the first or second connectivity sub-graph to its target location when the location of the at least one key connection node of the first or second connectivity sub-graph is changed.

12. A computer readable article of manufacture tangibly embodying non-transitory computer readable instructions which, when executed by the computer, cause the computer to carry out the steps of a method for animating transitions among graphs in a dynamic graph series having at least one preceding graph and at least one succeeding graph which are temporally sequentially displayed, wherein the graph has at least one unchanged node, removed node, and added node, wherein the method comprises the steps of:

selecting an unchanged node which is the nearest to a removed node and merging through animation the removed node with the unchanged node, thereby animating removal of the removed node; and selecting an unchanged node which is the nearest to an added node and splitting through animation the added node from the unchanged node, thereby animating addition of the added node;

wherein at least one of the steps is carried out using a computer device;

wherein animating removal of the removed node further comprises:

(a) searching the preceding graph for the nearest unchanged node connected with the removed node as a key connection point of the removed node; and (b) moving through animation the removed node from its current location to the location of the key connection point of the removed node;

wherein the searching associated with the removal further comprises:

(a) performing a Breath-First-Search from the removed node in the preceding graph to reach one or more unchanged nodes in the preceding graph which are connected with the removed node over the respective shortest paths;

(b) recording the shortest paths as a set of the shortest paths;

(c) calculating for each shortest path in the set of the shortest paths a weight of the shortest path by summing weights of respective edges in the shortest path;

(d) selecting a shortest path in the set of the shortest paths by the path weights; and (e) determining an unchanged node on the selected shortest path as the key connection point of the removed node;

wherein animating addition of the added node further comprises:

(a) searching the succeeding graph for the nearest unchanged node connected with the added node as a key connection point of the added node; and (b) moving through animation the added node from the location of the key connection point of the added node to a target location of the added node; and wherein the searching associated with the addition further comprises:

(a) performing a Breath-First-Search from the added node in the succeeding graph to reach one or more unchanged nodes in the succeeding graph which are connected with the added node over the respective shortest paths;

(b) recording the shortest paths as a set of the shortest paths;

(c) calculating for each shortest path in the set of the shortest paths a weight of the shortest path by summing weights of respective edges in the shortest path;

(d) selecting a shortest path in the set of the shortest paths by the path weights; and (e) determining an unchanged node on the selected shortest path as the key connection point of the added node.

* * * * *